(No Model.)
M. JINCKS.
SKINNING KNIFE.
No. 256,700. Patented Apr. 18, 1882.
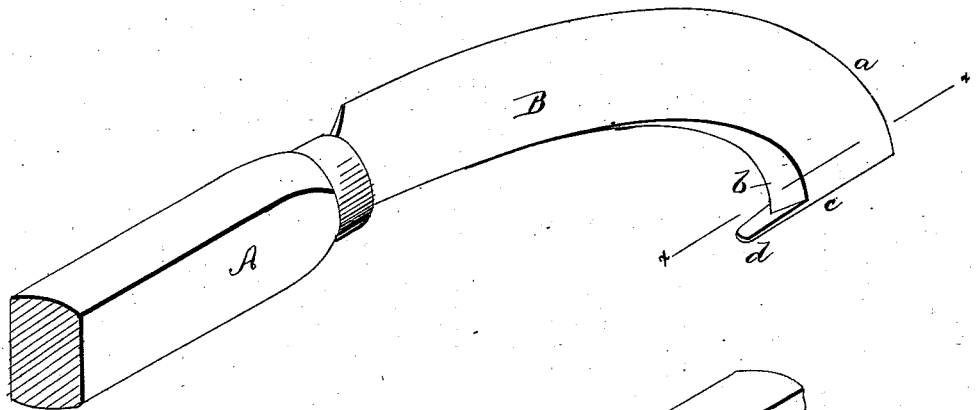
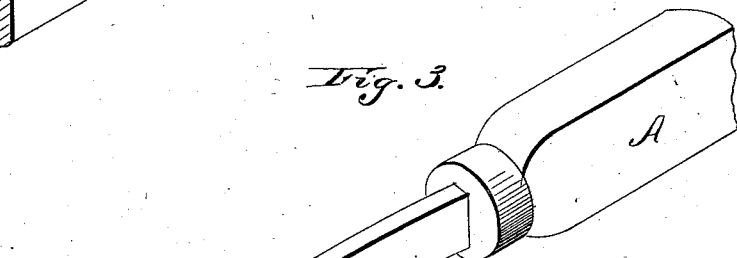
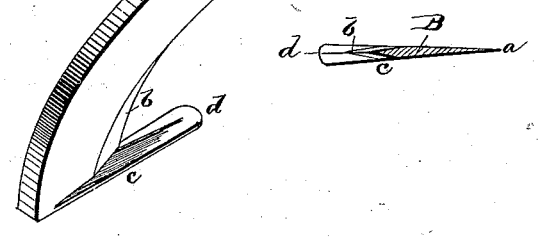
Witnesses:
H. C. McArthur,
W. R. Keyworth.
Inventor:
Melvin Jincks
per W. H. Alexander
Attorney.

UNITED STATES PATENT OFFICE.

MELVIN JINCKS, OF CONESUS CENTRE, NEW YORK.

SKINNING-KNIFE.

SPECIFICATION forming part of Letters Patent No. 256,700, dated April 18, 1882.

Application filed March 15, 1882. (No model.)

*To all whom it may concern:*

Be it known that I, MELVIN JINCKS, of Conesus Centre, in the county of Livingston and State of New York, have invented certain new and useful Improvements in Butcher-Knives; and I do hereby declare that the following is a full, clear, and exact description thereof, reference being had to the accompanying drawings, and to the letters of reference marked thereon, which form part of this specification, in which—

Figure 1 is a perspective view of my improved knife, and Fig. 2 is a cross-section through the blade at the point indicated by dotted line $x\ x$. Fig. 3 is a perspective view, showing a modification of Fig. 1.

This invention relates to knives which are especially designed for the use of butchers for the purpose of ripping and skinning animals; and the nature of my invention consists in a knife having a blade of curved form, which may be sharp or not on the convex edge, and provided at its end with a gage or guard-finger and a concave or hook-shaped sharp-edge back, as will be fully understood from the following description and the annexed drawings.

A designates the handle of the improved knife, and B the blade. This blade is constructed with a long convex cutting-edge for giving a deep drawing or thrust cut, especially intended for skinning the hide from the flesh without cutting the same. The back edge of the blade is concave longitudinally, and terminates in a short or hook-shaped cutting-edge, $b$, which is especially adapted for ripping the skin preparatory to removing the same with the aid of the longitudinally-convex cutting-edge $a$ of the blade. The end $c$ of the blade is straight longitudinally, and forms an acute angle with the point of the cutting-edge $a$. This blunt straight end or edge $c$ is elongated beyond the cutting-edge $b$, and tapered or beveled, so as to form a well-determined guide and gage, $d$, which runs in advance of the cutting-edge $b$ between the skin and flesh and keeps the blade down to the work and assists the butcher in guiding the knife during the operation of ripping the skin.

To use my knife a short incision is made through the skin with the point of the sharp edge $a$. The gage $d$ is then inserted through the said incision, and the skin cut or ripped any desired length by the operator drawing the knife toward him. The skinning process is then completed with the curved cutting-edge $a$. The elongated gage or guard $d$ effectually prevents the flesh from being cut while ripping the skin.

It is obvious that the gage or guard $d$ might be applied to any butcher's knife when a cutting-edge for ripping the skin is combined with said gage. It is also obvious that for ripping purposes only the curved edge $a$ may be blunt or dull.

Having described my invention, I claim—

A butcher's knife having a slitting-edge and a blunt guard extending beyond and approximately at right angles to said edge, substantially as described.

In testimony that I claim the foregoing as my own I affix my signature in presence of two witnesses.

MELVIN JINCKS.

Witnesses:
J. B. THURSTON,
C. BOWEN.